(No Model.) 2 Sheets—Sheet 1.

J. C. McCOLLUM.
MILKING MACHINE.

No. 484,505. Patented Oct. 18, 1892.

Witnesses. Inventor.
O. W. Harbeson. James C. McCollum
Alfred Townsend. Hazard & Townsend
his attys.

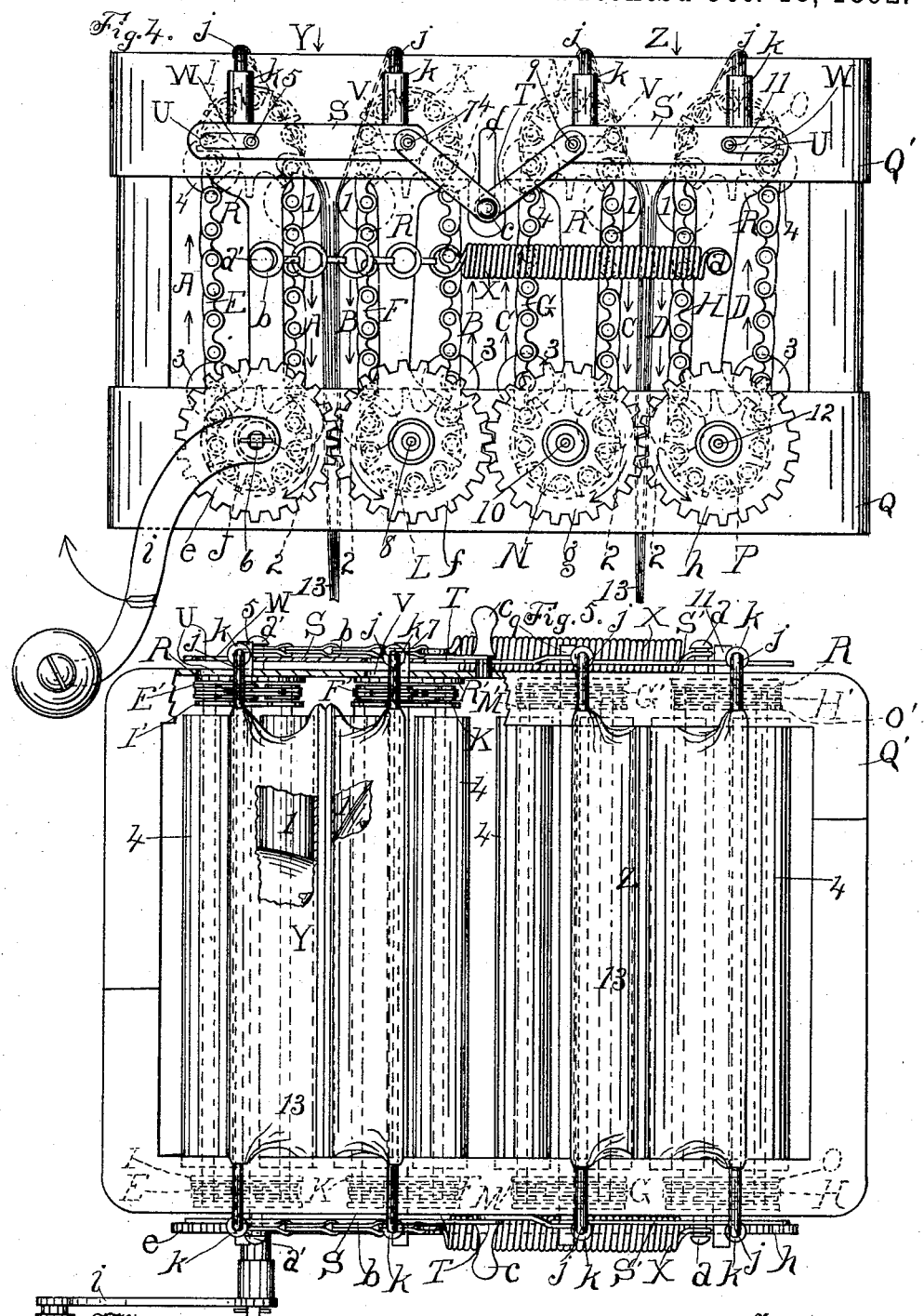

UNITED STATES PATENT OFFICE.

JAMES CALVIN McCOLLUM, OF LOS ANGELES, CALIFORNIA, ASSIGNOR OF ONE-HALF TO WILLIAM WARREN MURPHY, OF SAME PLACE.

MILKING-MACHINE.

SPECIFICATION forming part of Letters Patent No. 484,505, dated October 18, 1892.

Application filed November 19, 1891. Serial No. 412,453. (No model.)

*To all whom it may concern:*

Be it known that I, JAMES CALVIN McCOLLUM, a citizen of the United States, residing at Los Angeles, in the county of Los Angeles and State of California, have invented a new and useful Milking-Machine, of which the following is a specification, reference being made to the accompanying drawings, in which—

Figure 1:
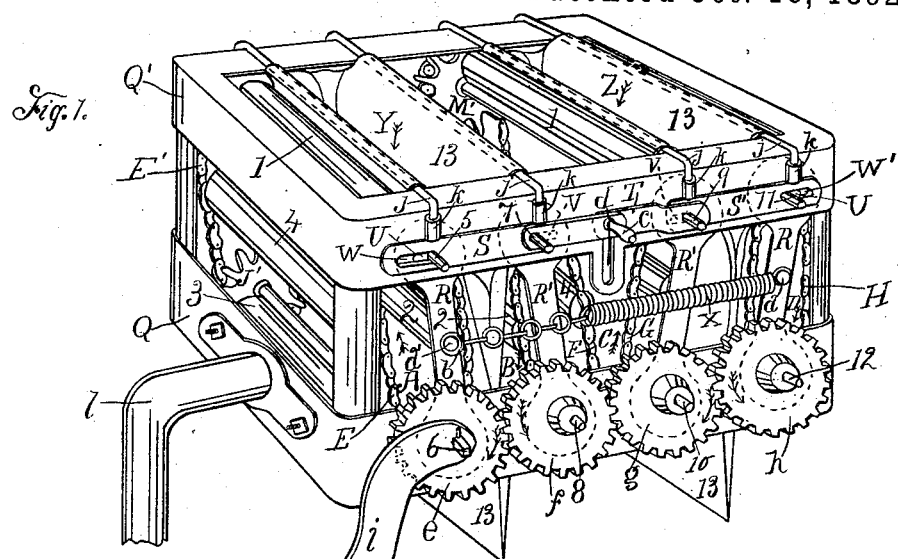
Figure 3:
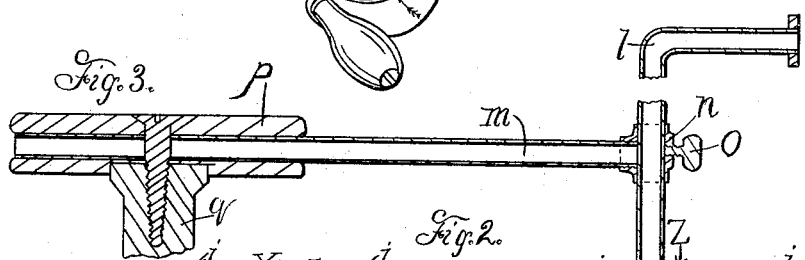
Figure 2:
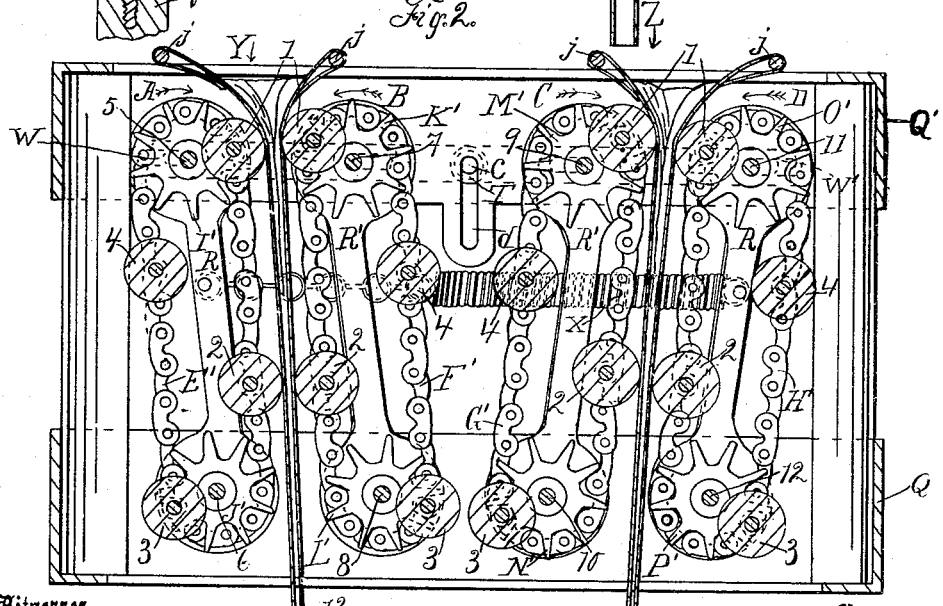

Figure 1 is a perspective view of my machine as it appears when provided with two sets of teat-compressing devices. All the drawings show this double form of machine; but it is to be understood that the machine may be made of different sizes with its rollers arranged to engage only one or two of the cow's teats at the same operation, if it is so desired, without in any wise departing from my invention as illustrated, for the reason that the machine shown is simply an assemblage of two teat-compressing devices, each of a width sufficient to operate upon two teats at once, so that the device is adapted to milk all the teats at once. Fig. 2 is a vertical mid-section of the machine transverse of the teat-compressing rollers. In this view and in Figs. 4 and 5 the supporting-standard, which is shown in part in Fig. 1, is removed and is not shown. Fig. 3 is a sectional view of such standard, the top of a stool, and the device for securing the standard to the stool. Fig. 4 is a plain side elevation of the machine with the teat-engaging devices set to milk a cow having her teats closer together than would be accommodated by the machine when the devices are set as shown in Figs. 1 and 2. Fig. 5 is a plan view. Portions of one of the teat-protectors are torn away to disclose the rollers 11, and a portion of the top of the frame is broken away to expose the sprocket wheels and chains.

My milking-machine consists, essentially, of the combination of two series of teat-compressing rollers and suitable mechanism arranged to bring pairs of such rollers into juxtaposition successively and move them downward for a distance in substantially parallel planes, whereby the cow's teats may be successively engaged by such pairs of juxtaposite rollers to force to milk down and out of the nipple.

My improved milking-machine embraces the combination of a series of endless belts provided, respectively, with series of teat-compressing rollers arranged oppositely in pairs upon suitable belt carrying and driving rollers, and means for rotating such rollers to drive the belts. The endless belts are each preferably formed of two sprocket-chains having the teat-compressing rollers journaled between them, and the driving-rollers and carrying-rollers consist, preferably, of sprocket-wheels fixed upon suitable shafts, the sprocket chains and wheels meshing together, so that the movement of the rollers will be uniform with relation to each other. The rollers are preferably cushioned to present a soft surface to the teat, and, as shown, they are constructed of an outer india-rubber cylinder and an axle of steel or other suitable metal. The axles are journaled in the links of the chain, the two chains of each belt being thereby secured to each other, thus to practically form a single endless belt carrying the teat-squeezing rollers. The several endless belts thus formed are oppositely arranged in sets or pairs with the teat-receiving space between them, so that when the belts are rotated toward each other the rollers will pass downward in close proximity and the teat will be intermittently engaged and released by the rollers pressing from the top downward.

My invention also comprises the combination, with such mechanism and double series of rollers, of a collapsible tube forming a flexible teat-protecting milk-conduit open at top and bottom and arranged in the space between the belts of the two series of rollers to receive the impact of such rollers and to conduct the milk down and out of the machine.

It also comprises the combination of two sets of such devices, mechanism for operating them simultaneously, and mechanism for moving the tops of such sets toward or from each other to adjust the machine for use on cows having greater or less space between the teats.

It also comprises the combination of the endless belts arranged in pairs and provided with the teat-compressing rollers, the belt-driving rollers, the adjustable or movable belt-carrying rollers, and springs arranged to press the belt-carrying rollers toward each other to partially close the space between the belts.

My milking-machine, as shown, consists, essentially, of four series A B C D of cushioned teat-compressing rollers arranged in two sets of two series each—i. e., A B form one set and C D form the other. Each of the series of each set comprises four rollers 1 2 3 4, which are journaled at their ends in the links of the sprocket-chains E E', F F', G G', and H H', which are arranged (in pairs to form practically the endless belts above mentioned) upon sprocket-wheels I I' J J' K K' L L' M M' N N' O O' P P', which wheels are arranged upon such shaft in pairs, as above mentioned, one sprocket-wheel at each end of each of the sprocket-wheel shafts 5 6 7 8 9 10 11 12, which are journaled to revolve in the frame Q Q' of the machine, and also in the slides S S', as hereinafter set forth.

The lower line of the belt-driving rollers or shafts 6, 8, 10, and 12 are stationarily journaled in the frame, while the belt-carrying shafts or rollers in the top line 5 7 9 11 are journaled in movable journal pieces or carriers R R', and are controlled by the slides S S', which are controlled, respectively, by the toggle-joints T, arranged to move the slide back and forth transverse to the axles of the rollers and also to the carriers, which are pivoted at their lower ends to the shafts of the driving-rollers or sprocket-wheel shafts 6, 8, 10, and 12, respectively. The several belt-carrying rollers or shafts are journaled in slots U V in the top bar of the frame and are also journaled in the slides S S', which are provided, respectively, with the slots W W', in which the sprocket-wheel shafts 5 and 11 are journaled to revolve and which allow a horizontal movement of such sprocket-shafts. The two outer or end carriers R R are connected by the springs X X, which force such outer carriers and their sprocket shafts and wheels toward each other, thereby forcing the rollers at the top of the machine to be held close together with a yielding pressure, so that when the rollers are driven against the cow's teats or the protecting-tube by the rotation of the sprocket-wheels the teat-compressing rollers may yield or spread apart to avoid exerting too great pressure upon the teat. The roller-controlling springs X X are secured to the carriers R R at one end by the pin a and at the other end by the pin a' and the chain b, the several links of which chain are adapted to fit upon the pin a' so as to allow the tension of the spring to be adjusted by hooking different links upon the pin. The pin c of the toggle-joint T slides in the vertical guide d, formed by a slot in the frame, so that when the pin is moved up it forces the slides S S' apart, and when moved down draws them toward each other. Figs. 1 and 2 show the slides forced apart to increase the distance between the tops of the teat-receiving spaces Y Z of the two sets of series, and Figs. 4 and 5 show them drawn toward each other to diminish the distance between the tops of such spaces. The inner ends of the slots U and V in the frame are arranged at a distance apart equal to the distance between the inner end of the slot W and the bearing of the sprocket-shaft 7 9 in the other end of the slide, so that when the slides are drawn toward each other, as shown in Fig. 4, the journals of the shafts 5, 7, 9, and 11 will rest against the frame, as well as against the bearings in the slides, thus increasing the surface of the bearings when in position. The slots U and W are of such length as to allow the play necessary to permit the machine to adjust itself to the size of the teats, whether the slides are thrown apart, as in Fig. 1, or toward each other, as shown in Fig. 4. The lower lines of shafts 6, 8, 10, and 12 are provided, respectively, with cog-wheels e, f, g, and h, meshed with each other in a straight train, and one of the shafts is provided with suitable means—such as the crank i—whereby the machine is operated.

Between the two series A and B and C and D, I arrange the flexible teat-protecting milk-conduits 13, which consist, essentially, of a narrow bottomless bag or collapsible tube of rubber cloth, the two sides of which are supported by two wire brackets j j, which are seated in sockets k in the slides S S', so that the movement of the slides does not change the relative position of the milk-conduit and the rollers which engage it.

The machine-supporting standard l is formed of gas-pipe or some other suitable contrivance and is clamped to the stool-bracket m by the socket n and set-screw o. The bracket m is secured to the stool p, which is preferably provided with but one leg q, as shown, but which may have a greater number, if desired.

In practice the operator mounts the machine upon the stool and rotates the crank in the direction indicated by the arrow thereon until the rollers and milk-conduit are in practically the position shown in Fig. 4. Then a reverse movement is made until the upper rollers—e. g., those marked 11 in said Fig. 4—are raised out of the receiving-passage, as shown by 11, Fig. 1, so that the teat can be inserted into such passage. This reverse movement pushes the conduit up slightly, thus relieving its tautness and allowing it to slide down again between the rollers with the teat as the teat is inserted so that there is no chafing upon the teat while being inserted. When the teat is inserted until the nipple rests upon the rollers next below, the crank is again rotated in the direction of the arrow, and this rotates the several cogs e, f, g, and h in the directions indicated by the curved arrows respectively thereupon, thus driving the two sets of sprocket-chains in the directions indicated by the arrows at A B and C D. This causes the rollers, which are arranged equidistant on the sprocket-chains, to successively be brought into contact with the milk-conduit in pairs, one opposite the other, to compress the teats with a rolling and gentle pressure, being near the udder and continuing to the end of the teat, and thus pressing the milk out and allowing the teat to be again filled from above before it is again engaged. The rotation of the crank is continued until the milk ceases to flow, and then it is reversed and the machine is lowered from the udder and the teats are then withdrawn from the machine.

Now having described my invention, what I claim as new, and desire to secure by Letters Patent, is—

1. The combination of the endless belts arranged in pairs and provided with the teat-compressing rollers, the carriers pivoted at their lower ends, the belt-driving rollers, the belt-carrying rollers journaled in the movable carriers, and springs arranged to press the carriers toward each other.

2. In a milking-machine of the class described, the combination of the belt-carrying rollers, the slotted slides S S', the toggle-joint T, pivoted to the slides, the frame of the machine provided with the vertical slot, and the pin of the toggle-joint arranged to slide in such slot.

JAMES CALVIN McCOLLUM.

Witnesses:
JAMES R. TOWNSEND,
ALFRED I. TOWNSEND.